(12) United States Patent
Chantereau

(10) Patent No.: US 9,023,132 B2
(45) Date of Patent: May 5, 2015

(54) METHOD FOR FILTRATION OF HARMFUL GAS EFFLUENTS FROM A NUCLEAR POWER PLANT

(71) Applicant: ALSTOM Technology Ltd, Baden (CH)

(72) Inventor: Philippe Chantereau, Sete (FR)

(73) Assignee: ALSTOM Technology Ltd, Baden (CH)

( * ) Notice: Subject to any disclaimer, the term of this patent is extended or adjusted under 35 U.S.C. 154(b) by 101 days.

(21) Appl. No.: 13/737,405

(22) Filed: Jan. 9, 2013

(65) Prior Publication Data

US 2013/0180399 A1 Jul. 18, 2013

Related U.S. Application Data

(60) Provisional application No. 61/659,705, filed on Jun. 14, 2012.

(30) Foreign Application Priority Data

Jan. 10, 2012 (FR) ...................................... 12 00074

(51) Int. Cl.
  *B01D 53/22* (2006.01)
  *G21F 9/02* (2006.01)
  *G21D 1/00* (2006.01)
  (Continued)

(52) U.S. Cl.
  CPC *B01D 53/22* (2013.01); *G21F 9/02* (2013.01); *B01D 53/226* (2013.01); *G21D 1/00* (2013.01); *G21D 3/04* (2013.01); *B01D 2257/11* (2013.01); *B01D 2257/20* (2013.01);
  (Continued)

(58) Field of Classification Search
  CPC ............ B01D 53/22; G21F 9/02; G21D 1/00; G21D 3/04
  USPC .......................... 95/43, 45, 47, 54; 96/4, 7, 11
  See application file for complete search history.

(56) References Cited

U.S. PATENT DOCUMENTS 3,736,421 A * 5/1973 Strange et al. .............. 250/341.1
4,158,639 A * 6/1979 Berty .............................. 588/13
(Continued)

FOREIGN PATENT DOCUMENTS

DE       38 15 850 A1    11/1989
EP       0 285 845 A1    10/1988
(Continued)

OTHER PUBLICATIONS

French Written Opinion and Search Report for FR 1200076, dated Sep. 11, 2012, Partial Translation.
(Continued)

*Primary Examiner* — Jason M Greene
*Assistant Examiner* — Anthony Shumate
(74) *Attorney, Agent, or Firm* — Rita D. Vacca

(57) ABSTRACT

A method for filtration of harmful gas effluents from a nuclear power plant including the steps of providing a gas effluent from a nuclear power plant, the effluent including a mixture of gases; filtering the harmful, notably radioactive elements from the gas effluent by membrane separation through at least one membrane, the membrane separation being achieved by sifting, sorption and/or diffusion; storing the filtered harmful elements in storage reservoirs, and discharging the processed gas effluent to the atmosphere.

15 Claims, 2 Drawing Sheets

Figure 1:
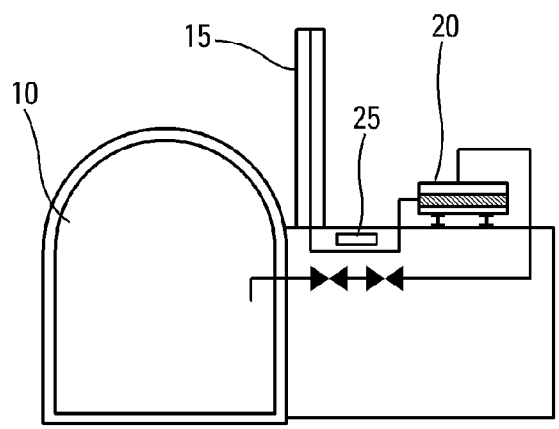

(51) Int. Cl.
*G21D 3/04* (2006.01)
*B01D 53/00* (2006.01)

(52) U.S. Cl.
CPC ........ *B01D 2257/2068* (2013.01); *Y02E 30/40* (2013.01); *B01D 53/00* (2013.01)

(56) References Cited

U.S. PATENT DOCUMENTS

| | | | |
|---|---|---|---|
| 4,186,303 A * | 1/1980 | Smith et al. | 250/253 |
| 4,391,615 A | 7/1983 | Iniotakis | |
| 4,430,293 A * | 2/1984 | Callaghan et al. | 376/314 |
| 4,873,050 A | 10/1989 | Eckardt | |
| 5,078,960 A | 1/1992 | Berg et al. | |
| 5,088,919 A * | 2/1992 | De Bruyne et al. | 431/328 |
| 5,267,283 A | 11/1993 | Berg et al. | |
| 5,976,220 A * | 11/1999 | Braun et al. | 95/45 |
| 6,095,356 A * | 8/2000 | Rits | 215/261 |
| 6,248,153 B1 * | 6/2001 | Braun et al. | 95/45 |
| 6,375,014 B1 | 4/2002 | Garcera et al. | |
| 7,255,725 B2 | 8/2007 | Chau et al. | |
| 2006/0049094 A1 | 3/2006 | Lescoche | |
| 2006/0083670 A1 | 4/2006 | Courtaud et al. | |
| 2007/0028770 A1 | 2/2007 | Tyndall et al. | |
| 2011/0031184 A1 | 2/2011 | Krause et al. | |
| 2013/0174732 A1 * | 7/2013 | Chantereau | 95/45 |
| 2013/0174737 A1 * | 7/2013 | Chantereau | 96/10 |

FOREIGN PATENT DOCUMENTS

| | | |
|---|---|---|
| EP | 0 332 950 A1 | 9/1989 |
| EP | 0 507 155 A1 | 10/1992 |
| EP | 0 870 534 A1 | 10/1998 |
| EP | 1 442 784 A1 | 8/2004 |
| FR | 1 279 694 | 12/1961 |
| FR | 2 846 255 A1 | 4/2004 |
| GB | 1 510 677 | 5/1978 |
| GB | 2 187 973 | 9/1987 |
| WO | 97/19454 | 5/1997 |

OTHER PUBLICATIONS

International Search Report for PCT/IB2013/000465, dated May 31, 2013, English.

Written Opinion for PCT/IB2013/000465, dated May 31, 2013, English.

* cited by examiner

METHOD FOR FILTRATION OF HARMFUL GAS EFFLUENTS FROM A NUCLEAR POWER PLANT

CROSS REFERENCE TO RELATED APPLICATIONS

This application is claiming priority based on French Patent Application No. 1200074, filed Jan. 10, 2012 and US Provisional Patent Application No. 61/659,705 filed Jun. 14, 2012, the contents of all of which are incorporated herein by reference in their entirety.

The present invention relates to a method for filtering gas effluents on industrial installations, and notably in the field of production of energy of nuclear origin.

More particularly, the invention may allow selective sorting at a high flow rate of chemical and/or radioactive species in the gas state, notably by membrane separation, the goal mainly being the secured recovery of gas discharges produced on the installation under normal operating and abnormal operating situations, in particular during a serious accident.

In the particular case of a nuclear installation, the impact on the environment is mainly related to the radioactive, thermal and chemical characteristics of the waste. Depending on their level of radioactivity and on their chemical composition, the radioactive elements are stored, processed and then packaged in order to form waste. Some of these radioactive elements are discharged in gaseous form into the atmosphere, of course at concentrations strictly defined by the applicable regulations. The gas discharges produced during normal operation generally stem from the purification and filtration circuits of the power plant, which collect a portion of the radioactive elements generated by the operation of the systems and equipment making up the installation. For example in France, these radioactive gas discharges produced by nuclear power plants may typically represent of the order of 1.1% of the allowed limit for rare or noble gases, 11.1% for tritium and 3.6% for iodines (both organic and inorganic). Helium, neon, argon, krypton, xenon and radon form the family of rare gases, group zero of the Periodic Table of the Chemical Elements, but the name of noble gases will be used hereafter as it is recommended by the IUPAC (International Union of Pure and Applied Chemistry) and by the "Bulletin Officiel du Ministère Français de l'Éducation nationale". These wastes are ordinarily of low activity and the radionuclides which they contain are not very toxic and generally have a short period. It should be noted that gas discharges contain solid and liquid particles. Those having a radioactive nature form aerosols with a highly variable grain size. Fission phenomena encountered on suspended dusts produce radionuclides such as halogens, noble gases, tritium and carbon 14. The composition and the radioactivity of the thereby formed aerosols depend to a great extent on the type of reactor and on the emission routes.

Ordinarily, the gas effluents of a nuclear power plant are treated before they are discharged into the atmosphere in order to extract most radioactive elements. The current practice consists of filtering the contaminated gases and the ventilation air of the premises so as to extract the radioactive particles therefrom before their discharge into the atmosphere. The air ventilation and purification systems generally include coarse pre-filters associated with absolute filters. As an indication, it will be noted that for particles with a diameter of the order of 0.3 mm, the extraction yield normally attains at least 99.9%.

Radioactive iodine is extracted by means of filters with impregnated charcoal, associated with dust filters. Impregnation of the coal is required in order to retain the iodinated organic compounds.

Radioactive noble gases which evolve from the fuel elements are released into the atmosphere in a deferred mode after disintegration in order to reduce the level of activity. Two methods are used for this purpose: buffer storage in special reservoirs or passage through several layers of charcoal. For storage, the noble gases and the carrier gas are therefore introduced by pumping them into sealed reservoirs where they are kept until their release is authorized into the atmosphere. The other method consists of having the effluent pass into a series of charcoal columns which delay the progress of the noble gases relatively to the carrier gases, thereby facilitating their radioactive decay.

Most methods for processing and packaging waste of low and medium activity are now well developed and are used on an industrial scale. The technology is sufficiently advanced for ensuring efficient management of the waste from the power plants, but improvements are always possible and desirable. The increasing budget for this management encourages the adoption of methods and techniques with which the produced amounts may be reduced to a minimum and the study of new means for further reducing the volumes at the processing and packaging stage. As an example, let us mention the use of specific mineral sorbents for improving processing of liquid waste; the membrane technique, also for treating liquid waste; the drying of resins in beads and of muds from filters; the incineration of depleted ion exchange resins; dry cleaning of clothes and other protective textile materials for reducing the volume of laundry waters; the use of highly resistant hermetically sealed containers for packaging dried filter muds; vitrification of certain wastes of medium activity for reducing the volumes to be removed; and overcompaction of non-fuel waste.

These techniques corresponding to the recent industrial state of the art will perhaps not be all universally applied to the management of waste, in particular at nuclear power plants, but this research and development effort shows the great care which the nuclear industry and power plant operators bring to the safety and to the economy of waste management, and announces enhancements.

The invention relates to the use in a specific method of a membrane technique to be used for processing gas effluents generated by industrial and notably nuclear installations.

In the case of a serious accident on the reactor of a nuclear power plant using the water reactor technology, i.e. about 95% of the present worldwide installed base, the atmosphere inside the reactor building changes over time and forms a mixture containing: air, steam, uncondensable gases (essentially $H_2$, CO, $CO_2$, fission products as aerosols, vapors and gases . . . ), the proportions of which may be variable both from a spatial and a time point of view. The increase in pressure which results from this and/or the accumulation of harmful products contained in this mixture finally lead to releases into the outer environment in order to avoid a loss of mechanical integrity consecutive to a hydrogen explosion or to the pressure exceeding the one admissible by the building. The fluid which escapes from the building may be air, radioactive gases, steam or a mixture of fluids. An object of this method is to separate during the degassing phase the radioactive and/or environmentally dangerous elements as regard discharges, to recover them for an optional particular treatment for storage or for reprocessing them with view to their possible re-use and to avoid a dangerous discharge into the environment.

In the early 80s, simple means were set into place on several nuclear power plants in order to limit the consequences of accidents. One of the goals was to be able to control and filter the gas discharges by means of a specific system.

Presently, these so-called <<palliative>> systems are used for causing a pressure drop in the reactor building by discharging the gases through a filtration process. Two different technologies exist on the operating worldwide nuclear installed base:

a sand filtration system on which the radioactive gases are trapped without any distinction: in the case of a serious accident, the pressure inside the containment vessel of the reactor building may increase more or less rapidly. By starting the sand filtration system, it is possible to discharge in a controlled way a portion of the gas-steam mixture. This would avoid excessive pressurization of the containment vessel while considerably limiting the radioactive discharges. These sand filters mainly used in France, allow about 50% of the harmful elements contained in the gas flow to be filtered, to be retained but are inoperative on noble gases. FIG. 1 illustrates a power plant 10 equipped with a sand filter 20 and a unit for measuring waste 25 positioned upstream from the gas discharge chimney 15;

a degassing system by sparging which does not allow selective degassing. In these circuits, a portion of the water circulating in the circuit escapes into the atmosphere as steam, notably when it passes into the air-cooling towers, and another portion is sent back into the environment in order to limit a too high concentration of non-vaporizable products. This system, notably used in Germany and in Sweden allows retention of about 75% of the harmful elements contained in the gas flow to be filtered, but is also inoperative on noble gases. It is very bulky (>100 m$^3$) and difficult and therefore costly to apply and to maintain.

Both of these systems are set into operation by voluntary either manually or assisted action for opening sectional valves. They require a driving pressure upstream in order to generate a flow and obtain efficient filtration. Their operation is passive up to a pressure threshold determined by the dimensioning of the filtration system and notably by its hydraulic resistance. Below this pressure threshold, actuators and therefore an electric power supply are required for extending the filtration function. Moreover, the monitoring of various parameters, notably environmental parameters, also requires a provision of electric energy.

The object of the present invention is to provide a method for filtration of contaminated and/or harmful, notably radioactive, gas effluents, which does not reproduce the aforementioned drawbacks.

The object of the present invention is notably to provide such a filtration method which is much more efficient, allowing substantial filtration of the totality of the harmful elements contained in the gas effluents to be processed.

The object of the present invention is notably to provide a method which allows both selective separation of radioactive gases during degassing, their trapping, their discrimination, their temporary storage, their optional processing for subsequent re-use, controlled dilution and treatment of the contaminated atmosphere of the containment vessel of a nuclear power plant.

The object of the present invention is also to provide a method for filtering gas effluents from a nuclear power plant, with permanent availability and able to operate continuously or intermittently depending on requirements.

The object of the present invention is also to provide a method for filtering gas effluents from a nuclear power plant, which operates in the case of a serious accident.

The object of the present invention is also to provide a device for filtering gas effluents from an industrial installation, said device including an improved membrane.

The object of the present invention is therefore a method for filtering harmful gas effluents from a nuclear power plant, comprising the following steps:

providing a gas effluent from a nuclear power plant, said gas effluent consisting of a mixture of gases, filtering the harmful, notably radioactive, elements of said gas effluent by membrane separation through at least one membrane, said membrane separation being achieved by sifting, sorption and/or diffusion, storing said filtered harmful elements in storage reservoirs, and discharging said processed gas effluent to the atmosphere.

According to a first alternative, said gas effluent to be processed consists of the gas atmosphere of a containment vessel after an accident, said gas effluent containing solid particles and a fraction of liquids in the vapor state.

According to another alternative, said gas effluent to be processed consists of the gas atmosphere of a containment vessel during normal operation.

According to another alternative, said gas effluent to be processed is extracted from a ventilation system.

According to another alternative, said gas effluent to be processed comprises fumes from a fire.

According to another alternative, said gas effluent to be processed stems from the dismantlement of a nuclear power plant.

Advantageously, said gas effluent to be processed comprises aerosols from fission products.

Advantageously, said gas effluent to be processed has a temperature greater than the temperature of the environment outside the power plant, and notably greater than 40° C.

Advantageously, said gas effluent to be processed has a processing flow rate of more than 1 kg/s, notably greater than 3.5 kg/s.

Advantageously, said gas effluent to be processed has a pressure above 1 bar, notably above 10 bars.

Advantageously, said storage reservoirs are gas storage reservoirs containing zeolites.

Advantageously, said method includes the following steps:
a first front filtration, notably with a metal pre-filter in order to reduce the outgoing radioactivity,
a second tangential filtration for separating air, $CO_2$, CO, steam and residual water from the effluent to be processed,
a third filtration by membrane separation for separating and storing the harmful elements, such as inorganic and organic iodines and noble gases, and discharging the remaining air, $CO_2$ and CO towards a chimney,
a fourth filtration, for recovering through gas permeation the carrier gas, such as nitrogen, for re-use or dilution inside the containment vessel via a return line.

Advantageously, said at least one membrane is formed on the basis of ceramic, such as silica carbide, of tungsten or titanium, of Kevlar and/or polymer such as PEEK (polyetheretherketone) or PTFE (polytetrafluoroethylene).

Advantageously, several membranes are used, each for filtering a specific harmful element of said gas effluent to be processed.

Advantageously, said method is of the passive type operating without provision of energy from the outside world.

Advantageously, said method has a purification coefficient of at least 100, advantageously at least 1,000, notably for the noble gases present in said gas effluent.

Figure 2:
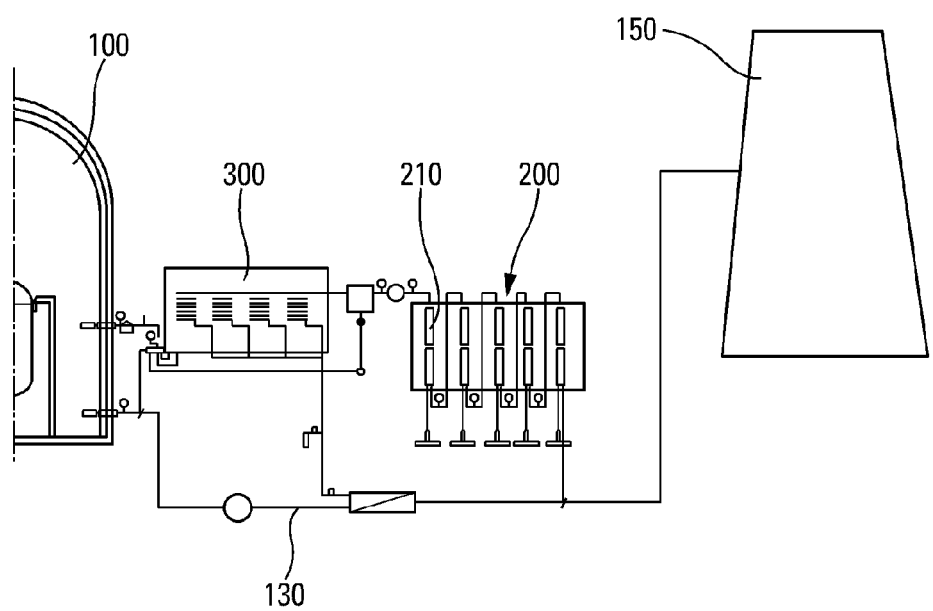
Figure 3:
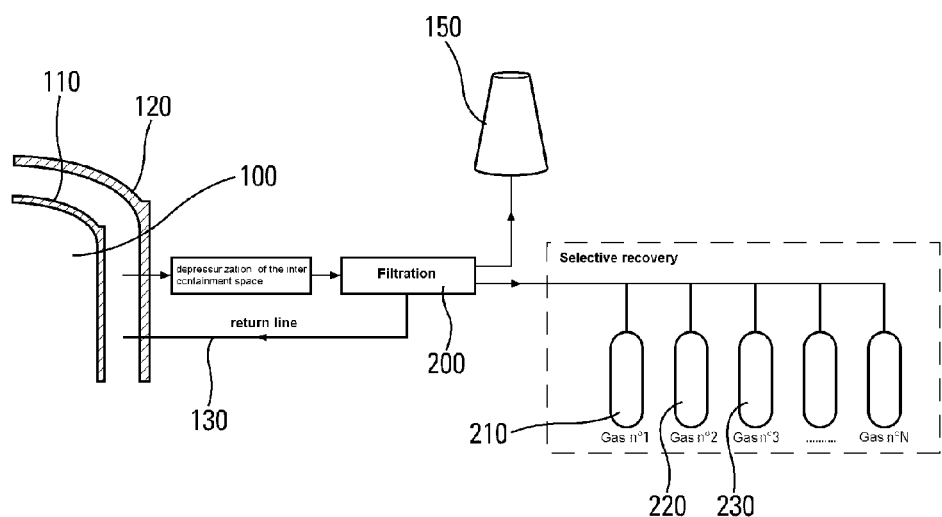
Figure 4:
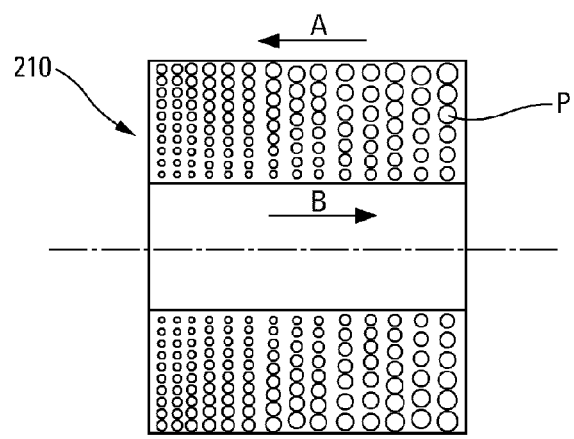

These features and advantages and other ones of the present invention will become more clearly apparent in the following detailed description of several embodiments of the invention, made with reference to the appended drawings, given as non-limiting examples, wherein:

FIG. 1 is a schematic view of a nuclear power plant using a sand filter of the prior art for processing gas effluents, FIG. 2 is a schematic view of a nuclear power plant applying a filtration method according to an advantageous embodiment, FIG. 3 is a schematic view of an alternative embodiment of the method, applied continuously on a nuclear power plant, and FIG. 4 is a schematic cross-sectional view of a membrane according to an advantageous embodiment.

The method will mainly be described with reference to its application on a nuclear power plant with a containment vessel, however it also applies to nuclear power plants without any containment vessel, and more generally to any type of industrial installation.

As regards pressurized water reactors of the French installed base, the containment vessel 100 has a volume of the order of 70,000 to 80,000 m³, and generally consists of a double wall 110, 120 in concrete, as illustrated in FIG. 3. The presence of fission products in the containment vessel (in the form of aerosols, vapors and gases) resulting from an accident leads to considerable β and γ dose rates in the atmosphere of the containment vessel, and in the sump where the majority of the aerosols settle. The expected dose rates in both of these phases are typically of the order of 10 kGy.h$^{-1}$.

Whatever the case, this value is notably dependent on the degradation condition of the fuel, on the fission products retained in the primary circuit, on the distribution of the fission products between the atmosphere and the sump in the containment vessel, itself a function of thermo-hydraulic conditions prevailing in the containment vessel and of course on the elapsed time since the accident.

The temperature of the gas effluent is typically greater than the ambient temperature of the environment outside the power plant. The generally accepted temperature is typically comprised between 40° C. and 140° C. according to the scenarios and to the time scale taken into account. It should be noted that temperatures below 40° C. or above 140° C. are possible. As to the humidity rate, it may itself also vary in a range from 0 to 100%, depending on the kinetics and the contemplated type of accident.

Radiolysis may lead to the formation of ozone, nitrous oxide $N_2O$, nitrogen monoxide NO, nitrogen dioxide $NO_2$, nitrous acid $HNO_2$ and nitric acid $HNO_3$.

Various teams have experimentally observed the formation of $O_3$, of $NO_2$ and of hemipentoxide $N_2O_5$, in dry air and of $O_3$, $NO_2$, $HNO_2$ and $HNO_3$ in humid air (0.5% water mass fraction). To summarize, the radiolytic products which may be present in the containment vessel in the case of a serious accident are in majority $NO_x$:$NO_2$ and $N_2O$, and of course $O_3$.

Experiments conducted by several laboratories including the IRSSN (<<Institut de Radioprotection et de Sûreté Nucléaire>>) within the scope of programs aiming at controlling the hydrogen risk in nuclear power plants and notably having dealt with the behavior of catalytic recombiners, have given the possibility of detecting physico-chemical reactions generating volatile iodine by dissociation of solid metal iodides.

The table below shows an order of magnitude of the main constituents estimated for the source term (typical discharge) encountered during a serious accident on reactors of the operating French installed base. As the source term is a characteristic of a family of reactors, differences may be seen depending on the countries. Nevertheless these values may be used as a dimensioning basis for carrying out the present invention applied to a nuclear power plant:

|  | Radiological activity | Mass equivalent |
| --- | --- | --- |
| Noble gases | 1E19 Bq | About 700 kg |
| Organic iodine | 2E16 Bq | About 1 kg |
| Inorganic iodine | 1E15 Bq | A few grams |
| Cesium | 1E16 Bq | About 2 kg |
| Strontium | 1E15 Bq | About 35 g |

The significant contribution of the noble gases is to be noted both in terms of level of activity and in discharged mass equivalent.

The present method may be dimensioned so as to be able to process flow rates of at least 1 kg/s, advantageously 3.5 kg/s, of humid air brought to a sufficient driving pressure for operating the system, i.e. at a pressure of at least 1 bar, advantageously at least 10 bars absolute, having an average specific gravity of 4 kg/m³ at 5 bars and capable of processing of the order of 1 kg or more of radioactive iodine over a period of several months, typically of three months.

In particular, the object of the present method is to provide non-polluting treatment which takes into account the whole of the aforementioned data of a fluid to be processed for which the required purification coefficients are:

For aerosols, the present method has a purification coefficient of more than a 1,000.

As regards inorganic iodines ($I_2$), the purification coefficient is greater than 1,000.

As regards organic iodines ($ICH_3$), the purification coefficient is greater than 100.

The present method advantageously demonstrates a very high purification coefficient, notably of more than 1,000 on noble gases.

The present method has a purification coefficient greater than 100 on ruthenium tetraoxide ($RuO_4$).

The goal of the present method is also to dilute over time the activity inside the containment vessel by treating the air containing radioactive gases.

The mentioned purification coefficient is defined as the measured upstream/downstream ratio at the filtration device.

The present method uses a membrane filtration method for carrying out degassing of the containment vessel: releasing as a minimum a flow rate of 3.5 to 7 kg/s under the effect of the pressure prevailing in the containment vessel, of a fluid consisting of air, steam, gases of the $O_3$, $NO_2$, $HNO_2$, $HNO_3$, $N_2O_5$ type, and of the presence of fission products in the containment vessel (in the form of aerosols, vapors and gases such as noble gases, inorganic iodines and organic iodines).

The present method advantageously uses as a carrier an inert gas such as nitrogen. The fluid treated by the present method may be saturated with water and with steam. In order to avoid recombinations and the risk of oxidation of the membranes by the water, either present or not, in the fluid to be treated, the water entirely saturated with gas and pressurized by these gases is directed by a pressure difference towards several, typically four batteries of hydrophobic degassing membranes 200. The membrane separation is achieved by sifting, sorption and/or diffusion. The gases, thus carried away by a carrier gas, such as nitrogen, pass through hydrophobic membranes (a degassing method with hollow fibers), notably by diffusion and separation by osmotic pressure, and are directed towards batteries of selective gas diffusion membranes, 210, 220, 230, . . . either in a cascade or in series which allows sorting and selecting of the gases depending on the requirements and/or on the benefit.

The membrane separation methods are based on the selective retention properties of membranes towards molecules to be separated. With the first gas diffusion membranes in a cascade, it is possible to take into account the whole of the aforementioned data and to recover the whole of the noble gases depending on the required purification coefficient.

These are selective membranes, notably based on ceramic, (inert towards radioactivity), which notably ensure separation of xenon, krypton and argon. The membranes may also be made in other suitable materials, such as for example carbides, notably of silica, tungsten or titanium, Kevlar, polymers, notably PEEK (polyetheretherketone) or PTFE (polytetrafluoroethylene). The whole of the thereby separated gases and present in the retentate may be stored in compressed form in sealed reservoirs each comprising a single gas species. These reservoirs allow both storage, radioactivity decay of fission products, possible re-use of the trapped gases, their neutralization or even their final discharge by dilution in air.

Gas diffusion and permselectivity of the membranes allow the gases to pass over specific ceramic membranes in order to trap inorganic iodines on the one hand and organic iodines on the other hand.

It is also possible to provide a passage over one (or more) membrane(s) on which have been grafted crown calyx4arene molecules trapping target elements such as cesium, and then on the same principle, passage over a membrane capturing strontium (for example, including another calyxarene selected for its particular affinity for strontium).

Each membrane includes a wall provided with an internal surface and an external surface. Said wall having pores P. The wall may be cylindrical or planar. Several walls may be superposed, coaxially in a cylindrical configuration or stacked in a planar configuration.

FIG. 4 schematically illustrates more particularly the structure of a membrane 210 with a tubular geometry. The wall of the membrane includes pores P suitable for retaining the harmful elements of the gas effluents. Depending on the material and on the dimensions of the pores, the membrane will be dedicated to the filtration of a given element. The dimensions of the pores are variable radially, for example decreasing from the outside towards the inside, and axially, for example decreasing from right to left in the position illustrated in FIG. 4. In this example, the gas flow to be filtered flows outside the membrane in the direction of the arrow A, while the carrier gas flows in the opposite direction inside the membrane, in the direction of the arrow B. The elements to be filtered in the gas flow will separate upon crossing the wall of the membrane, from the outside towards the inside, by passing from the largest pores to the smallest pores. This separation may operate under pressure, by a pressure difference between the inside and the outside of the membrane wall, or by diffusion.

The membranes are modules with calibrated hollow porous fibers. By helically winding the fibers, large exposure to flows with high degassing rates is possible with a minimum pressure drop. The pore diameters are controlled down to a few nanometers at each stage. These membranes thereby include variable porosity along the radial and longitudinal directions of the membrane surface, adapted to the molecular size to be trapped. An advantageous embodiment in ceramic material further exhibits total harmlessness of the material towards radioactivity.

The selection of the carrier gas $N_2$ allows recombination of the gases of the $NO_2$, $HNO_2$, $HNO_3$, $N_2O_5$ type into nitrogen and $H_2O$. At the outlet of the selective membranes, by measuring the gas contamination it is possible in a first phase to get a clean treated fluid discharge through a controlled solenoid valve towards the cooling and discharge chimney.

This solenoid valve also gives the possibility of sending all or part of the recovered nitrogen along a return line 130 for dilution of the contamination inside the containment vessel. This may be accomplished by sending back an oxygen-rich air but free of any radioactive element through a nitrogen separation membrane.

This method operates without external energy as long as the pressure in the water conditioning is greater than the lower bound value determined by the dimensioning of the system, typically 1.5 bars. Manually opening one of the inlet valves of the circuit causes automatic pressurization of the storage cylinders for storing the carrier gas (generally nitrogen) and the putting of this carrier gas into the circuit via an expansion valve.

On the other hand in the case of pressure lower than the lower bound value, typically 1.5 bars, the gases are degassed from the hydrophobic membranes by means of an actuator or a pressurized external circuit for example by means of a vacuum compressor.

Such an embodiment includes a vacuum pump providing suction inside an exchanger provided with an automatic purger and with a booster pump which sends back the water to the conditioning. This vacuum pump compresses the sucked-up gases in order to generate the high pressure on the side of the selective membranes.

The low pressure side of the selective membranes is achieved either by the suction generated by the air-cooling towers, or by suction of the recycling air inside the containment vessel by the fan.

Advantageously, the method comprises a first front filtration, notably with a metal pre-filter in order to reduce the outgoing radioactivity, a second tangential filtration for separating air, $CO_2$, CO, steam and residual water from the effluent to be processed, a third filtration by gas diffusion for separating and storing the harmful elements, such as inorganic and organic iodines and noble gases, and discharging the remaining air, $CO_2$ and CO towards a chimney 150, and a fourth filtration for recovering by gas permeation the carrier gas, such as nitrogen, for re-use or dilution inside the containment vessel 100 via a return line 130.

With the present method it is also possible to process the radioactive environment of the containment vessel except for an accident, so as to allow faster intervention in the containment vessel during scheduled interventions. This is notably illustrated in FIG. 3, where the atmosphere contained between both walls 110 and 120 is permanently monitored. In the case of a leak in the internal wall 110, the discharges may thus be filtered continuously until the next maintenance during which the leak will be repaired. This avoids stopping the power plant as soon as such a leak appears.

A particular advantage of the present method is its reliability and its particularly high efficiency. Indeed, it is possible to trap more than 99.5% of the harmful elements, and it is efficient on noble gases, unlike the existing devices.

The present method uses non-dispersive technology: no risk of foam or emulsion. The filtration systems are robust and without any mobile parts unlike the absorption columns of the rotary type. The method operates regardless of the changes in pressure of the containment vessel, of the hygrometry rates or of the temperature variation. The method is easy to create on an industrial scale, notably by taking into account linear expansion scales depending on the flow rate. It is clearly more economical than existing devices.

The present method resorts to the modularity principle and uses the technologies suitable for this, notably at the connections, assemblies and seals.

This modularity allows increased flexibility, the number of modules being adjustable depending on the contaminating elements of the containment vessel and on their recovery rate to be obtained.

The production of the modules is accomplished by assembling a few thousand to more than one million of elementary fibers, representing an accumulated length which may reach 1,000 km, for membrane surfaces of several hundred to several thousand square meters ($m^2$).

The present method comprises modules with hollow fibers with the structure of a tubular exchanger, with a high pressure (HP) circuit and a low pressure (LP) circuit, a tube side and a calender size. The present invention especially has the advantage of its compactness since the specific exchange surface area is much larger than that of a column: 2,000 to 3,000 $m^2/m^3$ instead of 30 to 300 $m^2/m^3$.

The present method allows selective degassing of all radioactive gases including noble gases.

The present method allows full management of gas discharges from the storage of compressed gases for possible processing or subsequent use by means of zeolites in order to transform them into solid waste.

The present method mounted on the ventilation systems allows possible dilution of the contamination of the containment vessel by a system with double discharge opportunities.

The present method used for processing gas discharges allows full management of noble gases.

The present method used for processing the gas effluents from circuits of nuclear power plants allows full management of their radioactive gases or of those dangerous for the environment.

The present method mounted on the circuits for recovering the evolved harmful gases during treatments of the injection circuits allows their recovery and their processing.

The performance of a membrane separation is the combined result of the intrinsic properties of the membrane:
  selectivity;
  permeability;
  operating parameters, such as pressures, temperature, layout of the flows in the modules.

Another important parameter for a membrane method is the pressure difference imposed on both sides of the membrane. An increase in this pressure difference (either by increasing the high pressure or decreasing the low pressure) leads to an increase in the driving force for the permeation and makes the separation easier.

For applications related to gas separation, it is often the low pressure of the permeate, the pressure at which the gas is produced, which is the important parameter for optimization, the high pressure being generally imposed by the upstream processes. From the point of view of the separation performances on a membrane, it is desirable that the low pressure be as low as possible.

According to another advantageous aspect, the sorting method by means of a plurality of membranes, as described above for a nuclear power plant, may also be used in other types of industrial installations, and notably chemical plants. The number and the type of membranes will be selected on the elements to be filtered and to be sorted out.

Although the present invention has been described with reference to particular embodiments thereof, it is understood that it is not limited by these embodiments, but that on the contrary one skilled in the art may provide all useful modifications thereto without departing from the scope of the present invention as defined by the appended claims.

The invention claimed is:

1. A method for filtering harmful gas effluents from a nuclear power plant, the method comprising:
   providing a gas effluent from a nuclear power plant, said gas effluent comprising a mixture of gases;
   filtering harmful radioactive elements from the gas effluent by membrane separation through at least one ceramic, carbide or polymer membrane, with the membrane separation achieved by sifting, sorption and/or diffusion to obtain filtered harmful radioactive elements and a processed gas effluent with a purification coefficient of at least 100;
   storing the filtered harmful radioactive elements in storage reservoirs; and
   discharging the processed gas effluent to an atmosphere.

2. The method according to claim 1, wherein the gas effluent comprises a gas atmosphere of a containment vessel, with the gas effluent containing solid particles and a fraction of liquids each in a vapor state.

3. The method according to claim 1, wherein the gas effluent comprises a gas atmosphere of a containment vessel during normal operation.

4. The method according to claim 1, wherein the gas effluent is extracted from a ventilation system prior to filtering.

5. The method according to claim 1, wherein the gas effluent comprises fumes from a fire.

6. The method according to claim 1, wherein the gas effluent is from dismantlement of a nuclear power plant.

7. The method according to claim 1, wherein the gas effluent comprises aerosols from fission products.

8. The method according to claim 1, wherein the gas effluent has a temperature greater than 40° C.

9. The method according to claim 1, wherein the gas effluent has a filtering flow rate greater than 1 kg/s.

10. The method according to claim 1, wherein the gas effluent has a filtering pressure of more than 1 bar.

11. The method according to claim 1, wherein the storage reservoirs are gas storage reservoirs containing zeolites.

12. The method according to claim 1, wherein filtering comprises
   filtering by a first filtration through a metal pre-filter for reducing radioactivity,
   filtering by a second filtration for separating air, $CO_2$, CO, steam and residual water from the gas effluent,
   filtering by a third filtration of said membrane separation for separating and storing the harmful elements and discharging the remaining air, $CO_2$ and CO to a chimney, and
   filtering by a fourth filtration for recovering by gas permeation a carrier gas for re-use or dilution inside a containment vessel.

13. The method according to claim 1, wherein the at least one membrane is ceramic.

14. The method according to claim 1, wherein the at least one membrane includes several membranes each for filtering a specific harmful element from the gas effluent filtered.

15. The method according to claim 1, wherein the method is achieved by a pressure of 1.5 bars or greater, without use of energy external from that of the nuclear power plant.

* * * * *